United States Patent [19]

Argent et al.

[11] Patent Number: 5,123,942
[45] Date of Patent: Jun. 23, 1992

[54] SYSTEM FOR CHARGING BATCH/CULLET IN A GLASS FURNACE

[75] Inventors: Ronald D. Argent, Allison Park; Clifford F. Crouse, Washington, both of Pa.

[73] Assignee: Frazier-Simplex, Inc., Washington, Pa.

[21] Appl. No.: 673,291

[22] Filed: Mar. 21, 1991

[51] Int. Cl.⁵ .............................................. C03B 3/00
[52] U.S. Cl. ........................................ 65/27; 65/134; 65/136; 65/335
[58] Field of Search ................. 65/27, 335, 134, 136

[56] References Cited

U.S. PATENT DOCUMENTS

| | | | |
|---|---|---|---|
| 2,114,545 | 4/1938 | Slayter | 65/27 X |
| 3,397,972 | 8/1968 | Brichard et al. | 65/27 |
| 3,780,889 | 12/1973 | Frazier et al. | 65/335 X |
| 3,868,031 | 2/1975 | Frazier et al. | 65/335 X |
| 4,432,780 | 2/1984 | Propster et al. | 65/134 X |
| 4,559,072 | 12/1985 | Harcuba | 65/27 X |
| 4,944,785 | 7/1990 | Sorg et al. | 65/27 X |
| 4,983,206 | 1/1991 | Trunzo | 65/335 |

Primary Examiner—Robert L. Lindsay
Attorney, Agent, or Firm—Webb, Burden, Ziesenheim & Webb

[57] ABSTRACT

A charger apparatus having a reciprocable charger plate for feeding batch and cullet to a glass melting furnace. The cullet is preferably first preheated in a charger mounted cullet feed hopper utilizing exhaust gas from the furnace as the heat source. The cullet feed hopper deposits a layer of preheated cullet over a layer of batch material on the charger plate prior to delivery to the furnace so as to reduce steam generation and dusting problems. The charger also includes a primary cullet hopper in which cold cullet is preheated with off-gas from the preheater of the cullet feed hopper for subsequent delivery to the cullet feed hopper. The charger may also include an under plate pusher which is tiltable about a vertical axis to provide improved melt control and to direct the charge away from the furnace sidewall so as to improve refractory life. Dusting and carry over of fines in the exhaust gas is minimized due to the use of pre-melt electrodes in the charging zone.

22 Claims, 5 Drawing Sheets

SYSTEM FOR CHARGING BATCH/CULLET IN A GLASS FURNACE

BACKGROUND OF THE INVENTION

The present invention relates generally to glass making and, more particularly, to charging apparatus and methods for introducing feed materials into a glass melting furnace. So-called blanket batch chargers and the details of construction thereof are well-known in the art, as evidenced by U.S. Pat. Nos. 3,780,889; 4,197,109; and 4,983,206, all commonly owned by the assignee of the present invention.

Heretofore, it has been common glass melting practice to employ raw batch as the predominant feed stock in the manufacture of glass product. Raw batch consists of a particulate mixture of the constituent minerals which make up the glass material after melting and refining. In continuous glass furnaces, the batch material is introduced into one end of the furnace and removed as melted glass from the opposite end while a nearly constant level of molten glass is maintained within the furnace. At the feed end of the furnace, the batch material is first melted in a melting zone. The melted material then moves to a zone of relatively quiescent flow where the newly formed glass is refined before it reaches the fore hearth region at which point the molten glass is removed for formation into a finished product, typically, flat glass, containers, or glass fiber.

The melting end of the furnace is equipped with a charging bay, generally referred to as the "doghouse" and for use with a so-called blanket batch charge feeder there is a suspended rear wall at the charging end of the furnace that is set inwardly from the rear wall of the doghouse leaving an open or semi-open trough between the rear wall of the charging bay and the inwardly offset suspended wall. The open charging area extends across a substantial part of the full width of the furnace, sometimes as much as 20 feet or more in width. This width varies and in present furnace structures can be on the order of 20 to 30 feet in width. The charging area or doghouse provides a downwardly extending open area above the molten glass surface into which the batch mixture of glass forming ingredients is charged. The batch charger disclosed in U.S. Pat. No. 4,983,206 and 3,780,889 has a charger plate that downwardly extends into the exposed area of the doghouse and reciprocates in a direction along the long axis of the furnace. The charger plate is positioned beneath a hopper chute such that as the charger plate moves forward from a retracted limit of travel, raw batch material from the hopper chute is deposited in a layer on the charger plate. Simultaneously, the nose or forward edge of the charger plate pushes a previously deposited layer of the floating batch under the suspended wall at the end of the doghouse into the melting zone of the furnace. As the charger plate moves rearwardly, the layer of batch material then residing on the plate is obstructed by a so-called sand seal device at the rear of the hopper and is prevented from being carried rearwardly. This obstruction causes the forward portion of the batch charge to be moved off of the charger plate over the nose thereof and into the open area of the furnace from which the previous charge has just been cleared. This reciprocating cycle is continuously or periodically repeated to maintain a substantially constant level of molten glass in the furnace as the melt is removed at the fore hearth region.

Typical glass batch feeders in present day plants are quite massive and, for example, in furnaces over 20 feet in width, there are typically two charger machines positioned side-by-side working in tandem to simultaneously feed the furnace. It has been observed that continuous melting furnaces of identical construction may exhibit unpredictable variations in performance due to eddy currents, convective currents, flame flow and other factors which influence the quality of the glass and fuel consumption or efficiency of the furnace. It has also been observed that a change in the feeding rate or in the makeup of the batch material results in a noticeable change in furnace operation.

In recent times, conservation principles have become more important to manufacturers in general and the glass industry is no exception. It is now becoming common practice to recycle used containers, such as aluminum and steel cans, as well as glass bottles, jars and the like. Recycled glass, known as cullet, potentially represents a significant savings in natural resources and energy since the recycled cullet replaces some or all of the raw batch material heretofore used in the glass melting furnace. By using recycled cullet, the total amount of virgin raw materials needed to make a finished glass product is significantly reduced. High levels of cullet are commonplace today in the container glass industry, particularly with green and amber glass types.

Responsive to this recycling trend, cullet cleaning systems have become quite sophisticated and, as a result, the quality of cullet has become generally quite acceptable to glass bottle manufacturers. It is, therefore, not uncommon presently for glass bottle makers to employ upwards of 80% by weight cullet, or more, in the furnace charge along with raw batch material. While such usage of recycled glass is economically sound and environmentally friendly, the use of recycled glass cullet in such high ratios is currently creating new problems for the glass manufacturer.

Heretofore, the handling and mixing or remixing of cullet in the batch house and the transfer of clean cullet to the furnace area for remelting has caused much concern. In addition, it is common to preheat the cullet prior to charging it with the raw batch into the furnace in order to decrease the melting time of the cullet in the glass furnace. When the preheated dry cullet comes in contact with the raw batch material, the unheated wet batch generates steam which causes unwanted dust generation from the batch material and from the powdery glass fines present in the glass cullet. The physical mixing of the batch and cullet has also been problematic since the two materials, when mixed, tend to segregate due to the particle size, density and strength differences between cullet and pelletized batch which results in a non-homogeneous furnace charge. A layer of wet batch material has been heretofore deposited on top of a layer of preheated cullet which necessarily eliminates the above segregation problem, but not the aforementioned steam generation and dusting problems. In addition, the cullet preheating systems of the prior art are physically separated from the charging machine and the extra time required to transfer the cullet from the preheater to the furnace charging area results in unwanted heat loss in the cullet material.

The use of cullet and batch material mixtures also results in somewhat slower melting of the charge as it progresses outwardly into the furnace. If the charge material has not fully melted by the time it reaches the mid-furnace exhaust ducts, dust from the unmelted batch and from the unmelted cullet fines will carry over into the exhaust gases. Such dust carryover causes maintenance and environmental clean-up problems. A further problem involved in feeding raw batch resides in the fact that this material, upon melting, forms a chemically active slag which attacks the refractories lining the sidewalls of the furnace in the melting zone. Attempts have been made to reduce this problem by directing the batch charge away from the sidewall refractories as in the tiltable charger plate disclosed in the commonly assigned U.S. Pat. No. 3,780,889.

The above enumerated problems, as well as others heretofore encountered in charging batch material and cullet, are solved by the present invention. Our invention is directed to a charging system for a glass furnace which permits the use of batch and cullet mixtures with improved handling and preheating of the cullet fraction. The present invention provides a charging system for a glass furnace which permits the concurrent use of cullet and wet batch materials of varying ratios without the steam generation and dusting problems encountered in the prior art. The present invention still further provides a system which allows faster melting of the cullet/batch charge material as well as greater control of the movement of the charge after delivery thereof to the glass furnace. The charging system of the invention also contemplates an apparatus and a method of operation in which energy costs are reduced due to the efficient preheating of the cullet. Still further, a method of operation according to the invention provides a more efficient use of cullet fines while reducing problems of cullet fines and batch dust carryover in furnace exhaust gases resulting in greater raw material utilization and reduced air pollution. Cleaner exhaust gas from the furnace also naturally results in more efficient operation of the heat exchange apparatus and less maintenance expense therein. In addition, the present invention provides a charging system for cullet and batch material which minimizes the problem of sidewall refractory attack by the batch heretofore encountered in the prior art.

SUMMARY OF THE INVENTION

These, as well as other features and advantages are provided by the present invention which, briefly stated, includes an improved charger apparatus of the general type having a reciprocating charger plate or pan for receiving and charging feed stock material into a glass melting furnace. A raw batch hopper is positioned above the charger plate having a plurality of laterally extending, vertically adjustable gates to regulate the amount of batch deposited on the charger plate. The charger so far described is conventional. It is an improvement according to the present invention to provide a cullet feed hopper mounted on the charger in a position downstream from the batch hopper, whereby a layer of cullet is deposited over the previously deposited layer of raw batch prior to charging in the furnace as a layered composite of cullet over raw batch. The cullet feed hopper preferably includes heat exchange apparatus associated therewith for supplying a preheat treatment to the cullet material contained therein. As a result, preheated cullet is delivered to the furnace in less than 30 seconds from the time of discharge from the preheated cullet hopper so as to minimize heat loss during transfer.

The improvement further includes duct means communicating with the exhaust flues of the glass furnace and with the heat exchange apparatus of the cullet feed hopper to transmit hot exhaust gases from the furnace to the cullet feed hopper. After a given dwell time in the heat exchange apparatus of the cullet feed hopper, the hot furnace exhaust gases are directed by appropriate ducting to a second heat exchange apparatus associated with a primary cullet hopper. The primary cullet hopper is preferably mounted on load cells to enable variable feed rates to be accommodated employing an on-line weight to discharge interconnection. The batch hopper may also have a primary feed hopper which is also supported by load cells to sense the live batch weight therein and to insure that a proper amount of raw batch is being fed to the primary batch hopper on the charger machine.

In combination with the improved feeding of cullet and batch material, the present invention also contemplates the positioning of molybdenum electrodes on opposite sides of the doghouse charging area to increase the melting rate of the charged materials. Accelerated melting of the charge insures that there are no unmelted fines present on top of the bath as it moves toward the exhaust flues in the mid-furnace region so as to reduce the potential for dust carryover. In addition, by regulating the temperature generated by the electrodes positioned in the doghouse area, the convection flow characteristics of the molten bath are further controlled.

Also in accordance with the present invention, the charger apparatus includes a pusher device mounted under charger plate similar to that disclosed and claimed in copending Pat. application Ser. No. 07/656,571 of Clifford Crouse which permits the positioning of a charge further into the glass bath. In this regard, it is contemplated to also provide a charger plate tilting mechanism which allows the pusher element to extend outwardly at an angular relationship relative to the sidewall of the furnace. In this manner, the charge material is pushed toward the center line of the furnace and away from the sidewall thereof so as to reduce the opportunity for chemical reaction between the batch material and the refractory.

In accordance with a method of the present invention, the cullet fines are pre-mixed with the batch material in pelletized form to reduce one source of dust carryover while also increasing the utilization of cullet. A further method of operation contemplates providing a batch charger having a plurality of batch feeder gates extending from one furnace sidewall to an opposite sidewall. The batch hopper gates adjacent the sidewalls are moved to a closed position such that the batch deposited on the reciprocating charger plate contains no batch material at the outer edge adjacent the furnace sidewall. The batch profile gradually increases to a greater depth toward the center of the charger plate. The area of the charger plate adjacent the outer edges then contains all cullet material. In this manner, when the composite charge is delivered to the glass melting furnace, only cullet material is adjacent to the refractory sidewalls so that the heretofore harmful reaction between the melting batch material and the refractory brick is eliminated. The details and advantages of the invention will become more apparent when reference is made to the appended drawings.

DETAILED DESCRIPTION OF THE INVENTION

Figure 1:
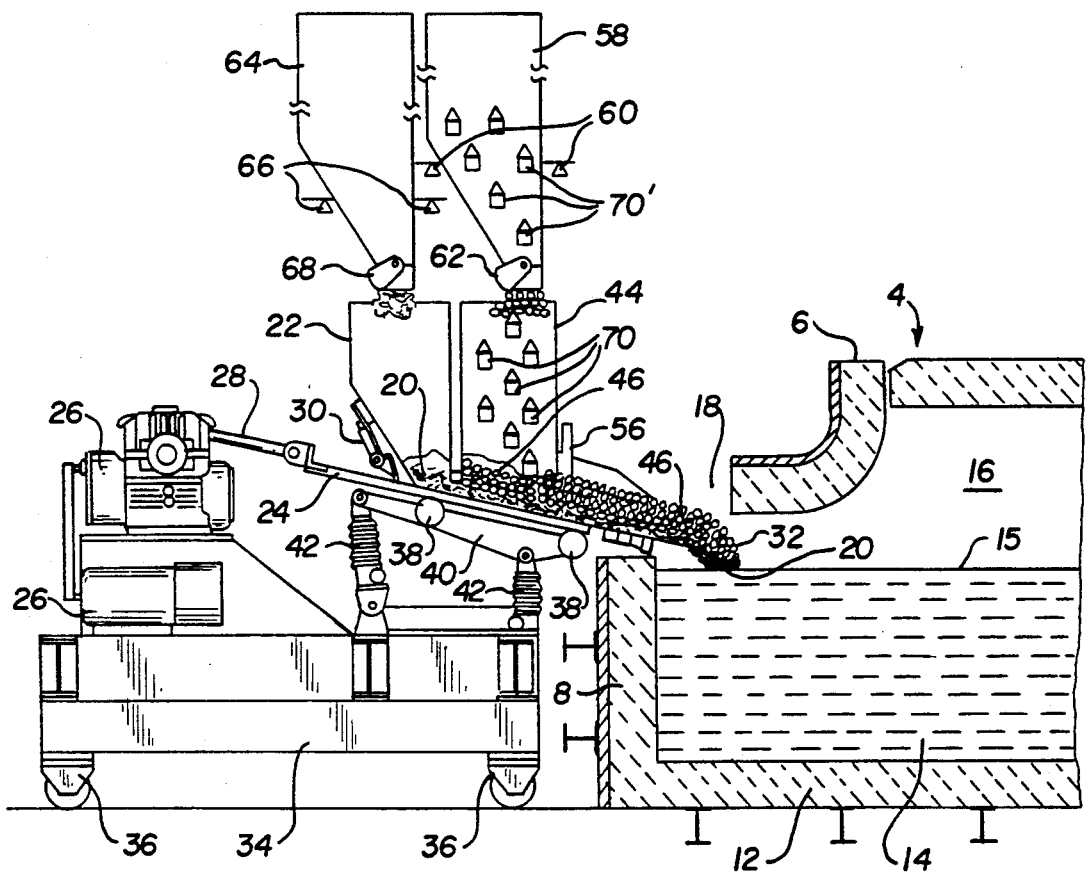
FIG. 1 is a side elevation view of a batch/cullet charger of the present invention positioned adjacent to a charging end of a glass furnace wherein a portion of the sidewall is removed in order to more clearly depict the placement of charge materials onto the charger plate thereof.

With reference to FIG. 1, the batch/cullet charger of the present invention, generally identified by reference numeral 2, is shown in an operable position adjacent to the charging end of a glass melting furnace, generally designated by reference numeral 4. A typical glass furnace includes a suspended rear wall 6 spaced inwardly from a lower stationary wall 8 which joins sidewalls 10, FIG. 3, and bottom 12. The furnace is lined with a refractory brick material to confine a molten bath of glass 14 therein having a surface 15 exposed to the interior of the combustion chamber 16 of the furnace. The suspended rear wall 6 and the lower stationary wall 8 define a so called doghouse or charging area 18 where the feed stock charging takes place, which is well-known in machines and furnaces of this type.

Figure 2:
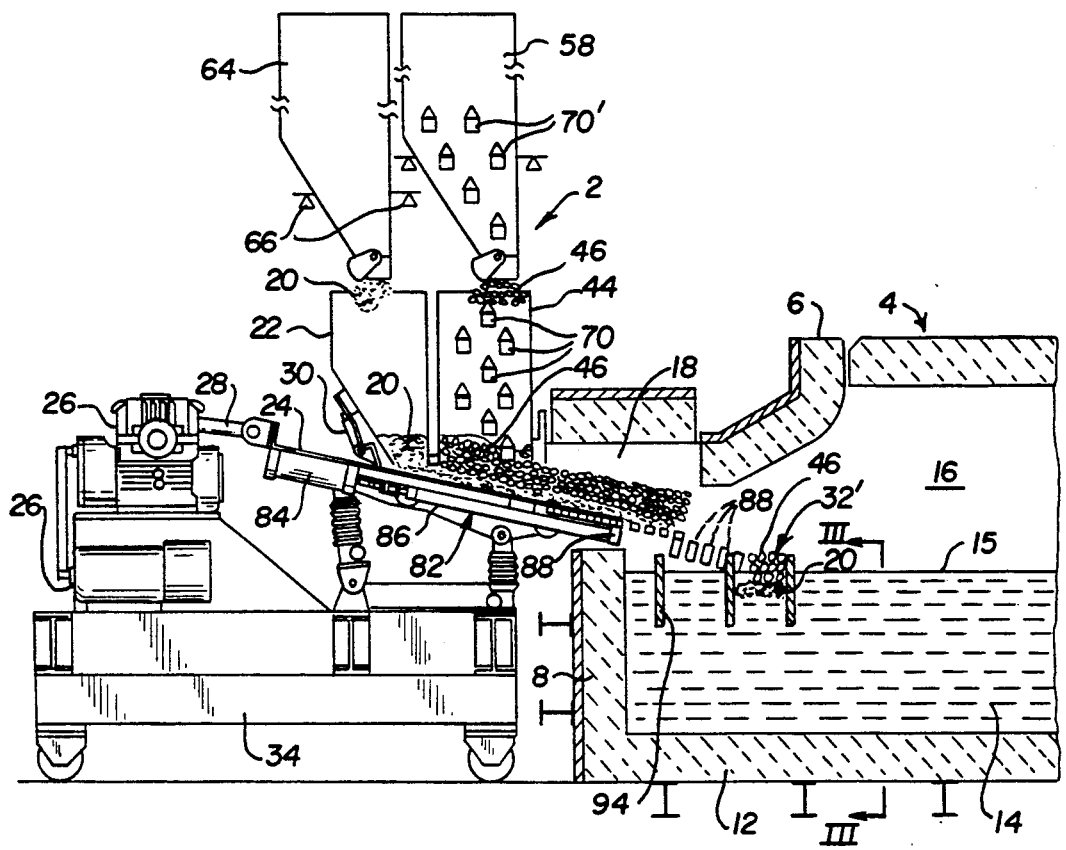
FIG. 2 is a side elevation view similar to FIG. 1 with the addition of an under plate pusher mechanism associated with the charger as well as heating electrodes positioned in the glass furnace.

The charger 2 includes a supporting base or frame 34 mounted on wheeled truck assemblies 36 for travel on floor mounted rails toward and away from the rear wall 8 of the glass furnace in a conventional manner. When in production, the charger 2 is positioned adjacent to the glass furnace 4 as shown in FIGS. 1 and 2. In operation, the charger plate 24 reciprocates on roller members 38 which are carried by a tiltable frame 40 which, in turn, is tiltably adjustable by jacking members 42, as described in aforementioned U.S. Pat. No. 4,983,206.

Raw batch material 20 is placed in a batch hopper 22 which is supported by a framing structure of the charger 2 in a conventional manner, well-known in the art. The charger plate 24 is reciprocated by a drive motor 26 and crank linkage 28. The batch material 20 deposited on the charger plate 24 is blocked from rearward movement by a sand seal device 30 when the plate 24 retracts, which causes a charge 32 of feed stock to fall off the nose of the charger plate 24 onto the surface 15 of the molten glass within the doghouse area 18, all of which is conventional in batch chargers of this type. As successive charges 32 are placed onto the molten glass surface 15, the earlier placed charges are pushed into the furnace interior 16 whereupon the charge 32 gradually melts into and becomes a part of the molten glass bath 14.

The present invention represents an improvement over the prior chargers which heretofore have been used only for charging batch material into the furnace. The charger 2 includes a cullet feed hopper 44 mounted on the charger frame between the batch hopper 22 and the discharge end of the charger. The cullet feed hopper deposits a layer of cullet material 46 over the previously deposited layer of batch 20. The charge is then deposited onto the surface 15 of the molten bath of glass 14 as a layered composite of cullet 46 over batch material 20.

The height of the bed of cullet charge 46 deposited on the charger plate may be adjusted by way of a vertically moveable gate plate 56 mounted on the front face of cullet feed hopper 44. Cullet material 46 is preferably first contained in a primary cullet hopper 58 which is mounted on load cells 60 to continuously monitor the live weight of the cullet within the hopper 58. A shut off valve 62 is positioned at the outlet end of the hopper 58 to provide regulation of the flow of cullet from the hopper 58. The batch material 20 is also preferably contained in a primary batch hopper 64, the running weight of which is continuously monitored by load cells 66 with a valve 68 positioned at the outlet end of the hopper.

The load cells 60 and 66 enable variable feed rates to be accommodated, employing an on-line or live weight to discharge interconnection. Conventional vibratory feeding and control devices or the like are activated to feed material to the primary hoppers 58 and 64 when the respective load cells 60 and 66 sense that additional material is needed, all in a known manner.

According to the present invention, the cullet material 46 is subjected to a preheat treatment as it passes through the cullet feed hopper 44 as well as the primary cullet hopper 58. The preheat treatment is preferably accomplished by passing hot gas through a plurality of circuitous passageways 70 and 70' of pipe or tubing which pass through the interiors of the cullet hoppers 44 and 58. Sensible heat from the hot gas is transferred to the surrounding cullet material 46 as the cullet moves through the respective hoppers 58 and 54. Preheating of batch material 20 may also be accomplished in hoppers 22 and 64, if desired.

It will be appreciated that the cullet 46 is in contact with the heat exchange passageways 70 of hopper 44 and subject to the preheat treatment almost up to the time the material is deposited in the furnace as charge 32. In practice, the preheated cullet 46 normally is on the charger plate for only about 30 seconds from the time of discharge from hopper 44 until deposit on the surface 15 of the glass bath. It will be appreciated therefore that by placing the cullet feed hopper 44 in close proximity to the entrance to the furnace, very little heat is lost from the cullet charge. The placement of cullet 46 on top of the batch material 20, coupled with the short time that the two materials are in contact with each other prior to charging, results in little if any steam generation and dusting problems found in the prior art.

Figure 4:
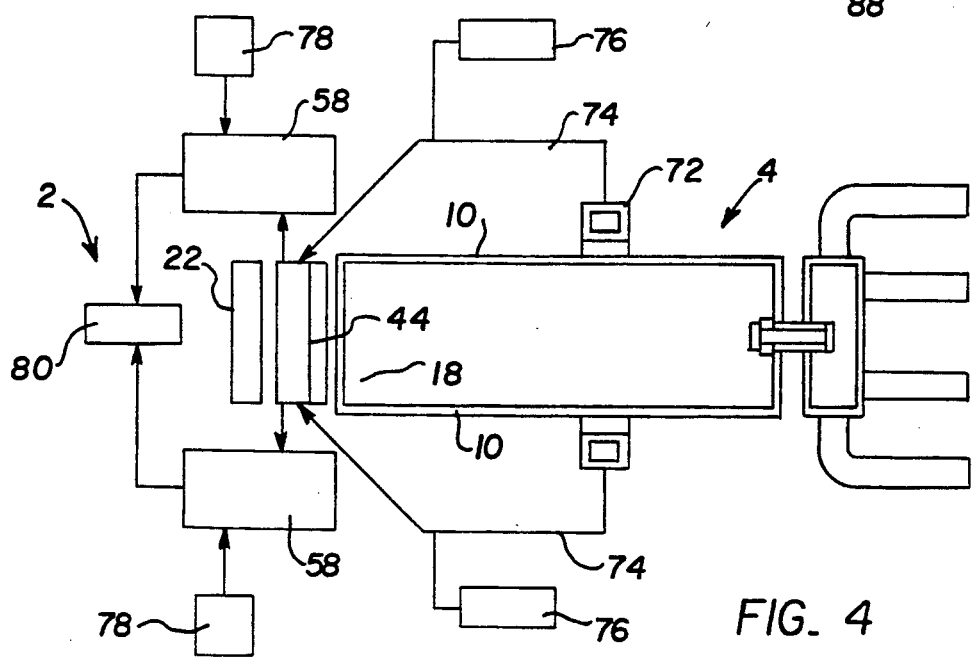
FIG. 4 is a schematic plan view of a typical glass melting furnace showing the charger and cullet preheat system of the present invention associated therewith.

A preferred system of utilizing and directing hot exhaust gases from the glass furnace 4 for preheating the cullet 46 is depicted schematically in FIG. 4. Typical exhaust flues 72 positioned in the mid portion of the glass furnace 4 carry hot exhaust gas from the interior 16 of the furnace which is transported by appropriate ductwork 74 to the heat exchange passageways 70 of the cullet feed hopper 44. One or more hot fans 76 communicate with the ductwork 74 to induce or direct a draft from the exhaust flues 72 and to control the temperature of the hot exhaust gas entering the heat exchange apparatus 70 of the cullet feed hopper 44. After an appropriate dwell time within the heat exchange passageways 70 of the cullet feed hopper 44, the exhaust gas which then still has a substantial, sensible heat content, is directed to the heat exchange passageways 70' of the previously sized and cleaned is introduced into the primary cullet hopper 58 from a cullet treatment site 78. The cold cullet may remain in the primary cullet hopper 58 a longer time than in the feed hopper 44 so as to receive sufficient preheat treatment therein. The spent exhaust gases leave the primary cullet hopper 58 to an exhaust duct 80 with appropriate particulate treatment means (not shown), if required. If additional heat is required in the primary cullet hopper 58, a portion of the exhaust gas stream from duct 74 may be routed directly from furnace 4 to the hopper 58 by appropriate valving and ducts (not shown).

When the recycled glass is crushed and sized into the particulate cullet material 46, there is a fraction of very fine glass dust or powder, which is present in the sized cullet. This powdery fraction causes problems when the cullet is charged into a glass furnace because it tends to be entrained in the furnace gases. The dust carryover problem causes maintenance problems in the ductwork and cleaning of the furnace heat exchange equipment and the like. Glass fines are also known to be very abrasive and tend to cause excessive wear in the duct work as well as in the dampers, valves and fans and associated air handling system. This fines carryover problem is virtually eliminated by the present invention. The fines fraction is removed from the sized cullet material in the handling station 78 and the cullet fines are combined with the raw batch material to form pellets for delivery to the batch hoppers 64 and 22. In addition to reducing the fines carryover problem, this method of pelletizing cullet fines and batch material also increases the utilization of the cullet material, thus saving a portion of the feed stock which would otherwise be lost in the exhaust gases.

Figure 3:
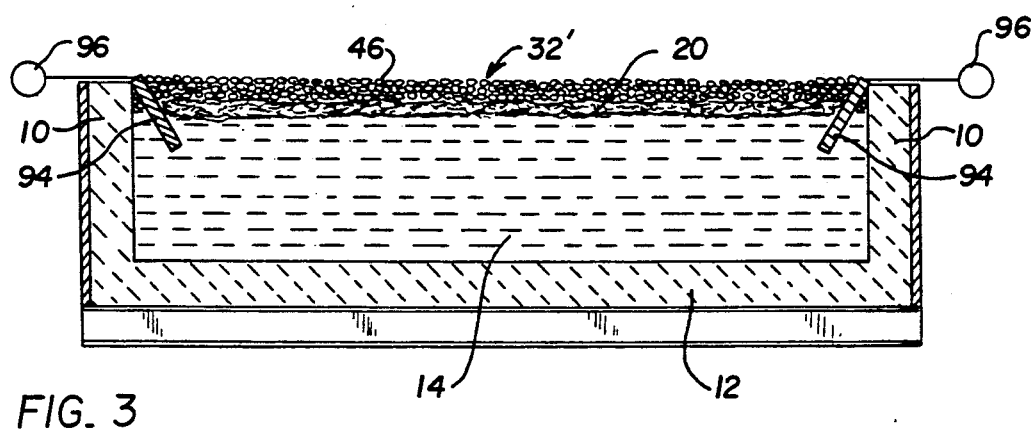
FIG. 3 is a cross sectional view of the glass furnace showing the electrodes positioned therein taken along section line III-III of FIG. 2 and showing a profiled layer of composite charge floating on the glass bath.

As shown in FIGS. 2 and 3, the use of electrodes 94 submerged in bath 14 creates a higher temperature in the charging area 18 of the molten glass to accelerate the melting of the cullet and batch material. The electrodes 94 are made of a molybdenum material and pass a current supplied by transformer 96 across the molten bath 14 causing a joule effect type of heating. The electrodes 94 create a higher temperature zone to insure pre-fritting or pre-melting of the batch 20 and cullet 46 before the melt current draws the material to the region of the exhaust flues 72. In this manner, there are no fine particulates from either the batch or the cullet which might become entrained in the exhaust gases exiting the furnace. This pre-melting area provided by the electrodes 94, along with the pelletized cullet fines and batch material provide an extremely clean furnace atmosphere and exhaust stream. The convection currents within the molten glass bath 14 may also be regulated by use of the electrodes 94. By adjusting the glass temperature in the charging area 18 of the furnace, the electrodes act as a convection control boost for the molten glass bath 14.

Figure 6:
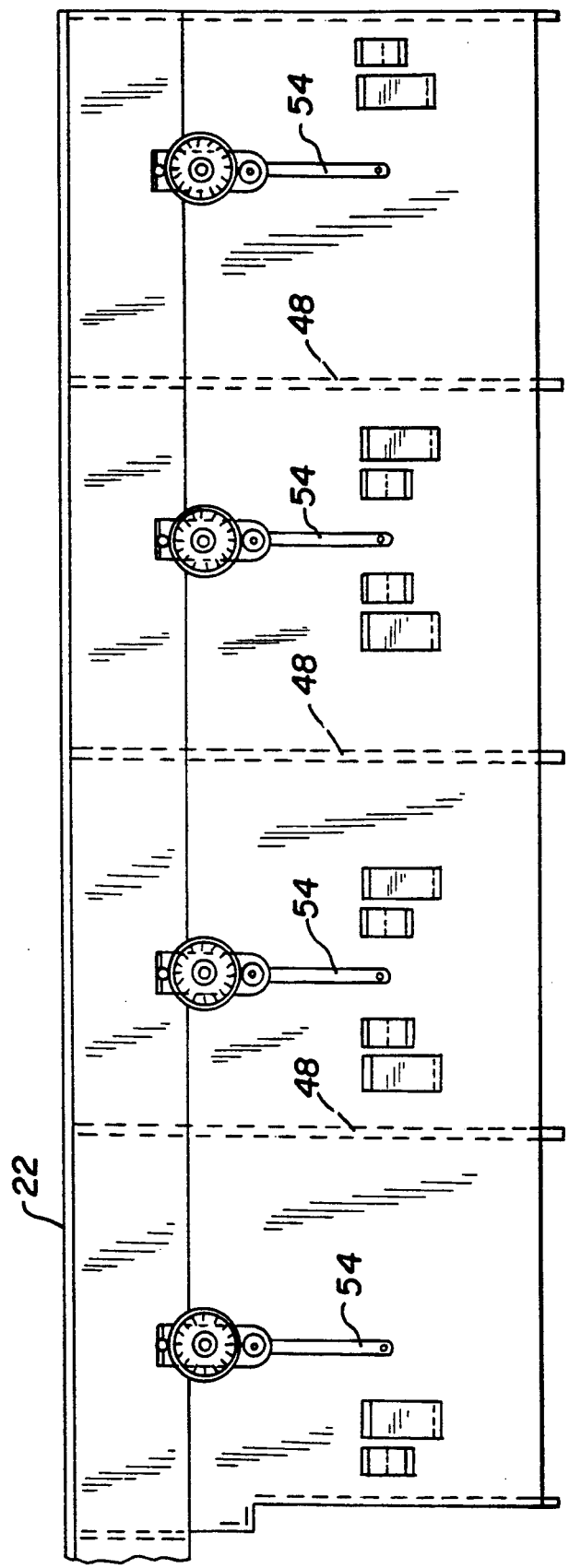
FIG. 6 is a rear elevation view of an array of compartments in the batch hopper showing the mechanisms for moving the adjustable batch gates.
Figure 7:
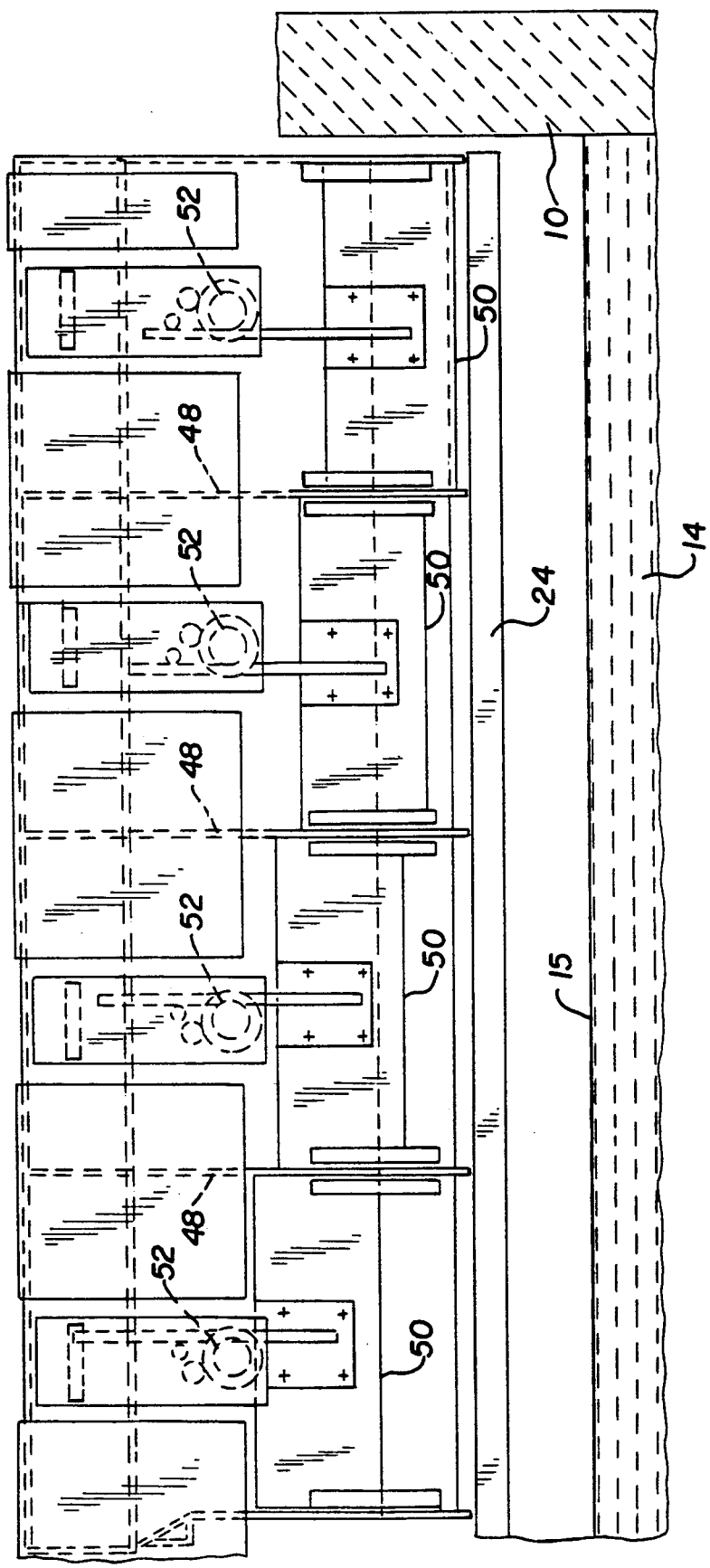
FIG. 7 is a front elevation of the batch hopper of FIG. 6 showing the adjustable batch gates in various vertical positions.

With reference to FIGS. 6 and 7, the batch hopper 22 has a plurality of vertically extending spaced apart partition walls 48 which define a plurality of side-by-side compartments which hold raw batch material for deposit on the charger plate 24. For simplicity purposes, FIGS. 6 and 7 only depict one-half of the array of feeder compartments within the batch hopper 22. Each of the units have, for example, four such feeder compartments located thereabove, assuming two chargers are used in side-by-side tandem array. Each of the hopper compartments defined by the vertical partitions 48 contains an adjustable batch gate 50, FIG. 7, to permit the height adjustment of the raw batch charge deposited on the charger plate 24 from each of the hopper compartments. The height of the bed of feed material from the hopper is determined by the spacing between the bottom edge of the adjustable gate 50 and the surface of the charger plate 24. The vertically moveable gates 50 are adjustable from a fully opened position as depicted at the left side of FIG. 7 to a fully closed position depicted at the right side of the drawing figure which permits profiling of the thickness of the charge of batch deposited across the width of the glass furnace. Thus, as seen in FIG. 7, the batch gate 50 adjacent to the refractory of sidewall 10 is in the fully closed position which prevents raw batch material from being deposited adjacent to the sidewall therefore avoiding the problem of chemical reaction between the batch material and the refractory brick. A molten slag reaction occurs while the batch material is melting and has been known to reduce refractory life by one-half. The profiling of the batch material is beneficial and does not result in any loss of throughput when this depleted edge area can be made up by the deposition of cullet material 46. A profiled charge is depicted in FIG. 3 wherein only cullet 46 is adjacent to the refractory sidewalls 10. The adjustable gates 50 of the batch hopper 22 are raised and lowered by a gear train arrangement, designated generally 52, which is motivated by a rotatable adjustment shaft extending from the rear face of the hopper 22 shown in FIG. 6 to the front or charging side thereof. The shafts are rotated by a ratchet handle device 54 which permits precise adjustment of the gate plates 50 from the rear of the charger. The above described type of batch gate plate adjustment is fully disclosed in commonly assigned Pat. No. 4,983,206.

Figure 5:
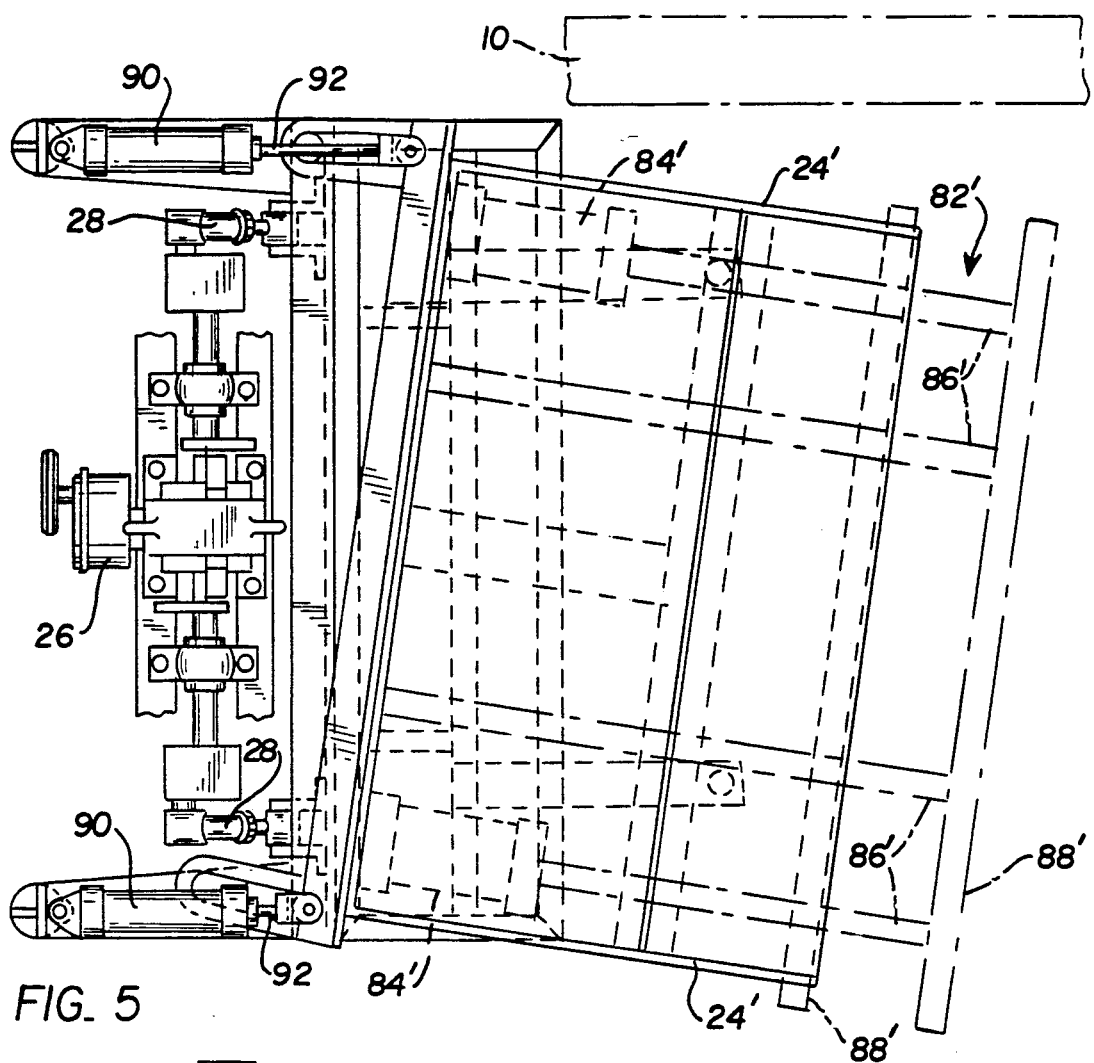
FIG. 5 is a top plan view of a tiltable charger plate and pusher arrangement utilized in the present invention.

The charger of the present invention in the modified embodiment of FIG. 2 includes an under plate pusher device 82. One or more hydraulic cylinders 84 reciprocally move a tubular frame structure 86 carrying an extensible, water-cooled nose portion 88 thereon. In an extended position, the under plate pusher 82 moves the charge 32' further into the interior of the furnace. Such an under plate pusher is the subject matter of co-pending patent application Ser. No. 07/656,571, filed Feb. 15, 1991, of Clifford Crouse, and owned by the assignee of the present application. Use of the under plate pusher 82 shown in FIG. 2 provides the furnace operator with additional versatility to move the charge 32, into various locations within the furnace or to submerge the charge for faster melting, operations which otherwise would not be possible. To further enhance this ability, the embodiment of FIG. 5 combines a tiltable or swingable charger plate combined with the under pan pusher. A tiltable charger plate of the type depicted in FIG. 5 is disclosed in U.S. Pat. No. 3,780,889, assigned to the owner of the present application. In this embodiment, the charger plate 24, is swingable about a vertical axis by movement of hydraulic cylinders 90 and piston rods 92. As shown in FIG. 5, the charger plate 24, may be tilted away from the furnace sidewall 10. When the under plate pusher 82, is activated, the nose portion 88, thereof serves to direct the charge away from the refractory sidewall 10 of the glass furnace and toward the center line of the furnace to provide a different flow pattern within the furnace as well as to keep the chemically reactive batch material away from the refractory brick.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

What is claimed is:

1. A charger for feeding batch material and cullet to a glass melting furnace, said charger of the type having a support frame with a batch hopper thereon adapted to receive pre-wetted batch material therein and a reciprocable charger plate positioned under the hopper for receiving pre-wetted batch material therefrom, the improvement comprising:
   a cullet feed hopper mounted on the charger positioned between said batch hopper and a discharge end of the charger, including heat exchange means for preheating the cullet, whereby a layer of preheated cullet is deposited over a layer of pre-wetted batch material for charging to said glass melting furnace at the discharge end of said charger.

2. The charger of claim 1 wherein the heat exchange means includes duct means adapted to communicate with an interior of the glass melting furnace for receiving hot exhaust gas from the furnace for preheating the cullet.

3. The charger of claim 2 including a primary cullet hopper means for holding cullet for delivery to said cullet feed hopper.

4. The charger of claim 3 wherein the primary cullet hopper means includes a heat exchange apparatus adapted to receive a hot gas stream for preheating the cullet in the primary cullet hopper.

5. The charger of claim 3 including load cell and control means associated with the primary cullet hopper for sensing a weight of cullet in said primary hopper and for maintaining a given cullet weight in said primary hopper whereby a selected feed rate from said cullet feed hopper is maintained.

6. The charger of claim 1 including pusher means positioned beneath said charger plate, said pusher means having a nose portion selectively extensible and retractable relative to said charger plate for pushing said batch and cullet charge a distance into the furnace.

7. The charger of claim 6 wherein the charger plate includes means for tilting said charger plate and pusher means about a vertical axis whereby the batch material and cullet may be charged and pushed into said furnace in a direction toward a centerline of said furnace.

8. The charger of claim 1 including electrode means positioned in a charging area of the furnace adapted to cause an increased rate of melting in said batch material and cullet.

9. The charger of claim 1 wherein the batch hopper includes a plurality of adjustable gates extending laterally across a width of said charger plate for regulating a flow of batch material therefrom whereby a profiled layer of varying height of batch material is deposited across said charger plate.

10. A charger for feeding batch material and cullet to a glass melting furnace, said charger of the type having a support frame with a batch hopper therein and a reciprocable charger plate positioned under the hopper for receiving batch material therefrom, the improvement comprising:
    a cullet feed hopper mounted on the charger adjacent to said batch hopper and positioned between said batch hopper and a discharge end of the charger, whereby a layer of cullet is deposited over the batch material on the charger plate;
    heat exchange means associated with the cullet feed hopper for preheating the cullet therein; and
    duct means associated with the heat exchange means adapted to receive hot exhaust gases from the glass furnace for preheating said cullet.

11. The charger of claim 10 including a primary cullet hopper means for holding cullet for delivery to said cullet feed hopper and wherein the primary cullet hopper means includes a heat exchanger apparatus adapted to receive a hot gas stream from the heat exchange means of the cullet feed hopper for preheating the cullet in the primary cullet hopper.

12. The charger of claim 11 including load cell and control means associated with the primary cullet hopper for sensing a weight of cullet in said primary hopper and for maintaining a given cullet weight in said primary hopper whereby a selected feed rate from said cullet feed hopper is maintained.

13. The charger of claim 10 including pusher means positioned beneath said charger plate for pushing said batch and cullet charge a distance into the furnace and wherein the charger plate includes means for tilting said charger plate and pusher means about a vertical axis whereby the batch material and cullet may be charged and pushed into said furnace in a direction toward a centerline of said furnace.

14. The charger of claim 10 including electrode means positioned in a charging area of the furnace adapted to cause a faster rate of melting in said batch material and cullet.

15. The charger of claim 10 wherein the batch hopper includes a plurality of adjustable gates extending laterally across a width of said charger plate for regulating a flow of batch material therefrom whereby a profiled layer of varying height of batch material is deposited across said charger plate.

16. A method of charging batch material and cullet to a glass melting furnace comprising:
    a) providing a reciprocable charger plate;
    b) depositing a layer of batch material on said charger plate;
    c) depositing a layer of cullet on said batch material; and
    d) charging said layers of batch material and cullet into the glass furnace.

17. The method of claim 16 including the steps of withdrawing hot exhaust gas from the furnace and preheating the cullet with said exhaust gas prior to said depositing step.

18. The method of claim 17 including the steps of mixing a cullet fine fraction with the batch material and pelletizing said mixture prior to said batch material depositing step.

19. The method of claim 17 including the steps of providing electrode heating means in a charging zone of said furnace and heating the batch material and cullet charged into said zone to cause an increased rate of melting thereof, whereby a dust carryover in said withdrawn exhaust gas is minimized.

20. The method of claim 16 including the step of profiling the layer of batch material deposited across the charger plate.

21. The method of claim 20 wherein said profiling step provides less batch material deposited along outer edge portions of said charger plate than present in a central portion whereby a chemical reaction between the batch material and the refractory furnace sidewall is minimized.

22. In a charger for feeding charge materials to a glass melting furnace of the type having a main support frame with hopper means associated therewith and a reciprocable charger plate positioned under the hopper means for receiving charge materials therefrom, the improvement comprising:

a charger plate including means for selectively tilting said charger plate about a vertical axis; and pusher means positioned beneath said charger plate, said pusher means having a nose portion selectively extensible and retractable relative to said charger plate, adapted to push a charge of material in said furnace.

* * * * *